(12) United States Patent
Kim et al.

(10) Patent No.: US 11,387,516 B2
(45) Date of Patent: Jul. 12, 2022

(54) BATTERY MODULE

(71) Applicant: LG Chem, Ltd., Seoul (KR)

(72) Inventors: Min Hyung Kim, Daejeon (KR); Hey Woong Park, Daejeon (KR); Seong Yoon Lim, Daejeon (KR)

(73) Assignee: LG Energy Solution, Ltd.

( * ) Notice: Subject to any disclaimer, the term of this patent is extended or adjusted under 35 U.S.C. 154(b) by 294 days.

(21) Appl. No.: 16/704,068

(22) Filed: Dec. 5, 2019

(65) Prior Publication Data

US 2020/0203687 A1  Jun. 25, 2020

(30) Foreign Application Priority Data

Dec. 5, 2018 (KR) .................. 10-2018-0155399

(51) Int. Cl.
*H01M 50/20* (2021.01)
*H01M 10/0585* (2010.01)
*H01M 10/613* (2014.01)
*H01M 50/209* (2021.01)

(52) U.S. Cl.
CPC ....... *H01M 50/20* (2021.01); *H01M 10/0585* (2013.01); *H01M 10/613* (2015.04); *H01M 50/209* (2021.01)

(58) Field of Classification Search
None
See application file for complete search history.

(56) References Cited

U.S. PATENT DOCUMENTS

| | | |
|---|---|---|
| 2006/0204840 A1 | 9/2006 | Jeon et al. |
| 2011/0318628 A1 | 12/2011 | Heim |
| 2018/0294535 A1* | 10/2018 | Choi ............... H01M 50/531 |

FOREIGN PATENT DOCUMENTS

| | | |
|---|---|---|
| KR | 20060099216 A | 9/2006 |
| KR | 20110012056 U | 12/2011 |
| KR | 20140061153 A | 5/2014 |
| KR | 20150033178 A | 4/2015 |
| KR | 20160054289 A | 5/2016 |
| KR | 20160150514 A | 12/2016 |

* cited by examiner

*Primary Examiner* — Carmen V Lyles-Irving
(74) *Attorney, Agent, or Firm* — Lerner, David, Littenberg, Krumholz & Mentlik, LLP (57) ABSTRACT

A battery module includes a secondary battery including an electrode assembly formed by alternately stacking an electrode and a separator and a pouch type battery case which accommodates the electrode assembly therein and in which an upper case and a lower case are integrated with each other, a housing which includes at least one opening and into which the secondary battery is inserted through an opening of the at least one opening, and a cooling unit formed in the housing and disposed at one side of the secondary battery. The battery case includes a folding edge part formed at an area on a side of the secondary battery at which the upper case and the lower case are folded at an edge where the upper case and the lower case are connected, and the folding edge part of the secondary battery directly contacts the cooling unit.

13 Claims, 7 Drawing Sheets

BATTERY MODULE

CROSS-REFERENCE TO RELATED APPLICATIONS

This application claims the priority of Korean Patent Application No. 10-2018-0155399, filed on Dec. 5, 2018, in the Korean Intellectual Property Office, the disclosure of which is incorporated herein by reference.

BACKGROUND OF THE INVENTION

Field of the Invention

The present invention relates to a battery module, and more particularly, to a battery module that is capable of improving energy efficiency to volume and cooling efficiency of secondary batteries.

Description of the Related Art

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In general, in order to manufacture the lithium secondary battery, first, electrode active material slurry is applied to a positive electrode collector and a negative electrode collector to manufacture a positive electrode and a negative electrode. Then, the electrodes are stacked on both sides of a separator form an electrode assembly. Also, the electrode assembly is accommodated in a battery case, an electrolyte is injected, and then, sealing is performed.

In a large electric device that consumes a large amount of power, a plurality of secondary batteries are required. In order to easily move and install the plurality of secondary batteries, a battery module may be manufactured, and then, a battery pack may be assembled using the battery module. When the plurality of secondary batteries are installed in the battery module, the secondary batteries may be fixed to stably supply electricity to the outside.

In order to produce electricity in an electrode assembly of the secondary battery, a chemical reaction occurs between an electrode and an electrolyte, and heat is generated in this process. However, when an ambient temperature excessively increases due to heat, there is a problem that a malfunction occurs in a circuit of the electric device in which the secondary battery is installed, or the lifespan of the electric device is shortened. Thus, the battery module includes a cooling system for cooling the secondary battery.

The cooling system are largely classified into a water cooling type that cools the secondary battery using cooling water and an air cooling type that cools the secondary battery using air. Among them, the water cooling type cooling system has cooling efficiency higher than the air cooling type cooling system and thus is more widely used. However, according to the related art, the cooling system is provided in plurality to be respectively applied to the plurality of secondary batteries. Therefore, since a ratio of a volume occupied by the secondary batteries is relatively small instead of excessively increasing in volume of the battery module, there is a problem that the energy efficiency to the volume of the battery module is deteriorated.

SUMMARY OF THE INVENTION

An aspect of the present invention provides a battery module that is capable of improving energy efficiency to volume and cooling efficiency of secondary batteries.

The objects of the present invention are not limited to the aforementioned object, but other objects not described herein will be clearly understood by those skilled in the art from descriptions below.

According to an aspect of the present invention, there is provided a battery module including: a secondary battery including an electrode assembly formed by alternately stacking an electrode and a separator, and a pouch type battery case which accommodates the electrode assembly therein and in which an upper case and a lower case are integrated with each other; a housing which includes at least one opening and into which the secondary battery is inserted through an opening of the at least one opening; and a cooling unit formed in the housing and disposed at one side of the secondary battery, wherein the battery case includes a folding edge part formed at an area on a side of the secondary battery at which the upper case and the lower case are folded at an edge where the upper case and the lower case are connected, and the folding edge part of the secondary battery directly contacts the cooling unit.

The folding edge part may extend along a full length direction of the secondary battery, which is greater than a full width direction of the secondary battery.

The secondary battery may have a ratio of a full length to a full width of 2:1 or more.

The cooling unit may have one surface facing an opening of the at least one opening.

The secondary battery may have a full width formed in a direction perpendicular to one surface of the cooling unit facing the secondary battery.

At least a pair of slots of the housing may be formed from an opening of the at least one opening at corresponding positions of a pair of inner walls of the housing that face each other.

Ends of the secondary battery may be inserted into the pair of slots, respectively.

The secondary battery may be one of a plurality of secondary batteries, and the plurality of secondary batteries may be arranged side by side in the housing.

The folding edge parts of the plurality of secondary batteries, respectively, may directly contact the same cooling unit.

The at least one opening may include a plurality of openings, and the plurality of openings may be formed in both sides of the housing, which are opposite to each other, respectively.

Opposing surfaces of the cooling unit may face the plurality of openings, respectively.

According to another aspect of the present invention, there is provided a battery pack including the battery module.

According to another aspect of the present invention, there is provided a device including the battery pack.

The device may include a computer, a notebook, a smart phone, a mobile phone, a tablet PC, a wearable electronic device, a power tool, an electric vehicle (EV), a hybrid electric vehicle (HEV), a plug-in hybrid electric vehicle (PHEV), or a power storage device, but is not limited thereto.

The structure of the device and the method for manufacturing the same are well known in the art, and thus their detailed descriptions will be omitted herein.

Particularities of other embodiments are included in the detailed description and drawings.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Advantages and features of the present invention, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may include plural forms unless specifically mentioned. The meaning of "comprises" and/or "including" does not exclude other components besides a mentioned component.

Hereinafter, preferred embodiments will be described in detail with reference to the accompanying drawings.

Figure 1:
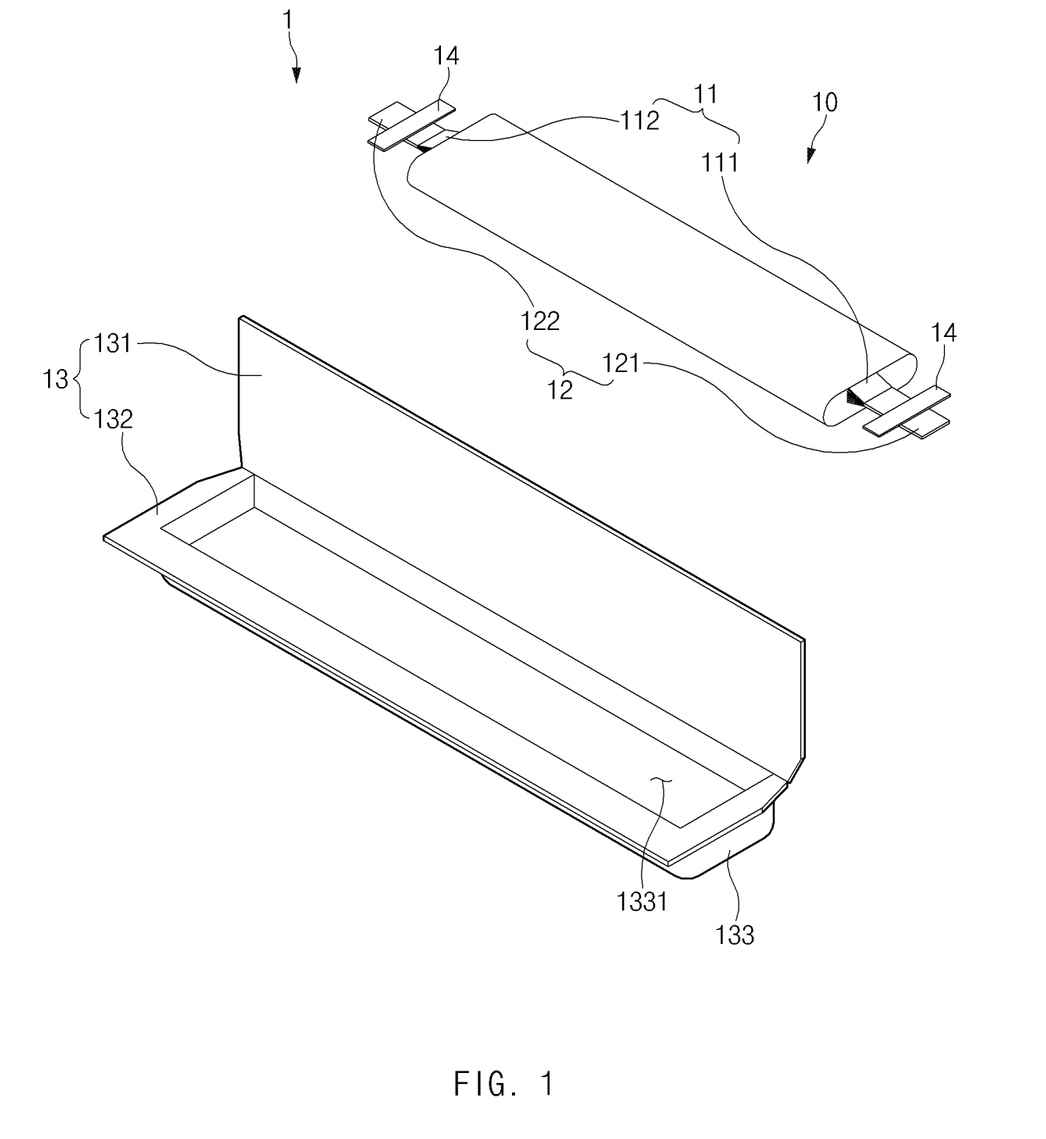
FIG. 1 is an exploded view of a secondary battery according to an embodiment of the present invention.

FIG. 1 is an exploded view of a secondary battery 1 according to an embodiment of the present invention.

As illustrated in FIG. 1, a pouch type secondary battery 1 according to an embodiment of the present invention includes a pouch type battery case 13 and an electrode assembly 10 accommodated in the battery case 13.

The electrode assembly 10 may be a stacked structure including two electrodes such as a positive electrode and a negative electrode and a separator interposed between the electrodes to insulate the electrodes from each other or disposed at a left or right side of one electrode. The stacked structure may have various shapes without being limited in shape. For example, the positive electrode and the negative electrode, each of which has a predetermined standard, may be stacked with the separator therebetween, or the stacked structure may be wound in the form of a jelly roll. Each of the two electrodes has a structure in which active material slurry is applied to a metal foil or a mesh-shaped collector including aluminum and copper. The slurry may be usually formed by agitating a granular active material, an auxiliary conductor, a binder, and a plasticizer with a solvent added. The solvent may be removed in the subsequent process.

As illustrated in FIG. 1, the electrode assembly 10 includes electrode tabs 11. The electrode tabs 11 are connected to each of a positive electrode and a negative electrode, respectively, of the electrode assembly 10 to protrude to the outside of the electrode assembly 10, thereby providing a path, through which electrons are moved, between the inside and outside of the electrode assembly 10. A collector of the electrode assembly 10 is constituted by a portion coated with an electrode active material and a distal end, on which the electrode active material is not applied, i.e., a non-coating portion. Also, the electrode tab 11 may be formed by cutting the non-coating portion or by connecting a separate conductive member to the non-coating portion through ultrasonic welding. As illustrated in FIG. 1, the electrode tabs 11 may protrude in each of different directions of the electrode assembly 10, but are not limited thereto. For example, the electrode tabs may protrude in parallel to each other from one side in the same direction.

In the electrode assembly 10, the electrode lead 12 is connected to the electrode tab 11 through spot welding. Also, a portion of the electrode lead 12 is surrounded by an insulation part 14. An insulation part 14 may be disposed to be limited within a sealing part, at which an upper case 131 and a lower case 132 are thermally fused, so as to be bonded to the battery case 13. Also, electricity generated from the electrode assembly 10 may be prevented from flowing to the battery case 13 through the electrode lead 12, and the sealing of the battery case 13 may be maintained. Thus, the insulation part 14 may be made of a nonconductor having non-conductivity, which is not electrically conductive. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

The electrode leads 12 may extend in different directions or extend in the same direction according to the formation positions of the positive electrode tab 111 and the negative electrode tab 112. The positive electrode lead 121 and the negative electrode lead 122 may be made of materials different from each other. That is, the positive electrode lead 121 may be made of the same material as the positive electrode plate, i.e., an aluminum (Al) material, and the negative electrode lead 122 may be made of the same material as the negative electrode plate, i.e., a copper (Cu) material or a copper material coated with nickel (Ni). Also, a portion of the electrode lead 12, which protrudes to the outside of the battery case 13, may be provided as a terminal part and electrically connected to an external terminal.

The battery case 13 is a pouch made of a flexible material. Also, the battery case 13 accommodates the electrode assembly 10 so that a portion of the electrode lead 12, i.e., the terminal part is exposed and then is sealed. As illustrated in FIG. 1, the battery case 13 includes the upper case 131 and the lower case 132. An accommodation space 1331 in which a cup part 133 is formed to accommodate the electrode assembly 10 may be provided in the lower case 132, and upper case 131 may cover an upper side of the accommodation space 1331 so that the electrode assembly 10 is not separated to the outside of the battery case 13. Although the cup part 133 is formed in only the lower case 132 in FIG. 1, the present invention is not limited thereto. For example, the cup part 133 may be variously formed, for example, formed in the upper case 131.

One side of the upper case 131 and one side of the lower case 132 may be connected to each other to be integrated with each other. Also, a folding edge part 135 (illustrated in FIG. 2) is formed at an area on a side of the secondary battery 1 at which the upper case 131 and the lower case 132 are folded at an edge where the upper case 131 and the lower case 132 are connected to each other to be integrated with each other. According to an embodiment of the present invention, the folding edge part 135 directly contacts a cooling unit 3 (illustrated in FIG. 4). However, if adjacent corners of the secondary battery 1 having a relatively short length therebetween are connected to each other, the folding edge part 135 formed by folding the upper case 131 and the lower case 132 at an edge relatively decreases in length, and the sealing part at which the upper case 131 and the lower case 132 are sealed to each other may relatively increase in length. That is, if the folding edge part 135 is formed at the side of the secondary battery 1 shown in FIG. 1 where the electrode lead 12 extends, the folding edge part 135 is relatively smaller in length than the sealing part. Therefore, the sealing part relatively increases in area, and thus, a relatively wider area has to be sealed after folding the upper case 131 and the lower case 132, which consumes more time and money. Also, since the folding edge part 135 that directly contacts the cooling unit 3 decreases in area, cooling efficiency is also reduced.

However, if adjacent corners of the secondary battery 1 having a relatively long length therebetween are connected to the each other, the folding edge part 135 relatively increases in length, and the sealing part relatively decreases in length. Therefore, since the sealing portion decreases in area to seal the relatively narrow area, the time and cost may be saved. Also, since the area that directly contacts the cooling unit 3 increases, the cooling efficiency is also improved.

Therefore, in order to allow the area of the folding edge part 135 to relatively increase, the adjacent corners of the secondary battery 1 having a relatively long length therebetween may be connected to each other as illustrated in FIG. 1. As a result, the folding edge part 135 of the secondary battery extends along a full length direction L (illustrated in FIG. 2), which is greater than a full width direction W (illustrated in FIG. 2) of the secondary battery. The secondary battery 1 may have a ratio of a full length to a full width of approximately 2:1 or more, and more particularly, a ratio of the full length to full width of 5:1 or more. As a result, a contact area with the cooling unit 3 may increase to further improve the cooling efficiency. When many secondary batteries 1 are arranged upright in the full width direction and arranged side by side inside a housing 2, the overall shape of the housing 2 may close to a square, and thus, the battery module 100 may be easily disposed.

When an electrode lead 12 is connected to the electrode tab 11 of the electrode assembly 10, and the insulation part 14 is provided on a portion of the electrode lead 12, the electrode assembly 10 may be accommodated in the accommodation space provided in the cup part 133 of the lower case 132, and the upper case 131 may cover an upper portion of the accommodation space. Also, the electrolyte is injected, and the sealing part provided on an edge of each of the upper case 131 and the lower case 132 is sealed. The electrolyte may move lithium ions generated by electrochemical reaction of the electrode during charging and discharging of the secondary battery 1. The electrolyte may include a non-aqueous organic electrolyte that is a mixture of a lithium salt and a high-purity organic solvent or a polymer using a polymer electrolyte. The pouch type secondary battery 1 may be manufactured through the above-described method.

Figure 2:
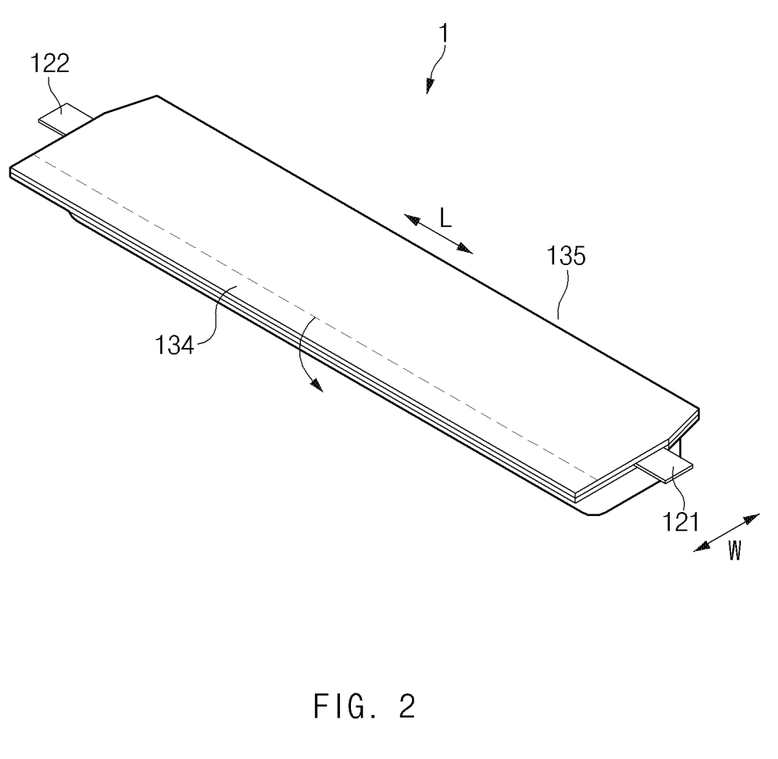
FIG. 2 is a perspective view illustrating a state before a sealed side part of the secondary battery is bent according to an embodiment of the present invention.
Figure 3:
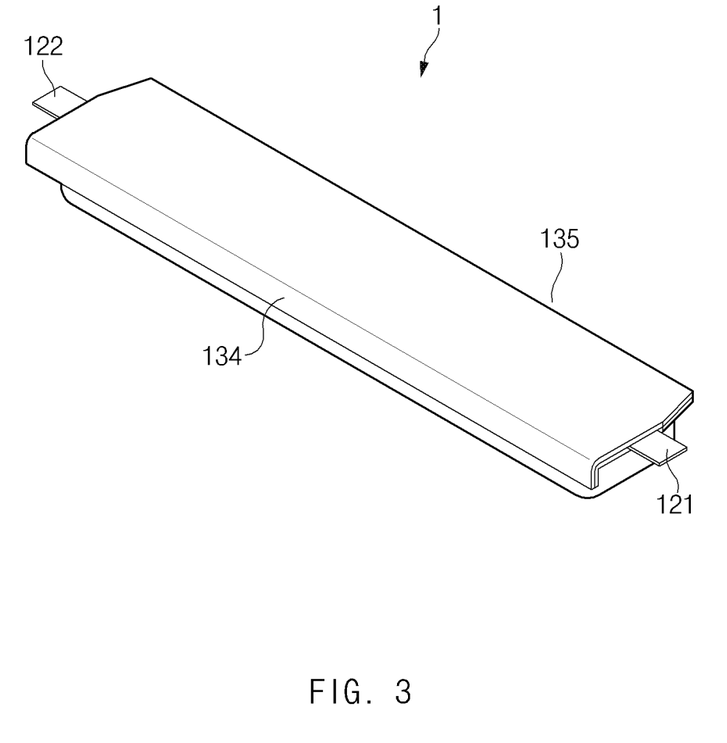
FIG. 3 is a perspective view illustrating a state in which the secondary battery is completely manufactured according to an embodiment of the present invention.

FIG. 2 is a perspective view illustrating a state before a sealed side part 134 of the secondary battery 1 is bent according to an embodiment of the present invention, and FIG. 3 is a perspective view illustrating a state in which the secondary battery 1 is completely manufactured according to an embodiment of the present invention.

When the sealing formed on the edges of the upper case 131 and the lower case 132 is sealed, the sealed side part 134 is formed as illustrated in FIG. 2. As illustrated in FIG. 3, the sealed side part 134 may be bent to one side to completely manufacture the secondary battery 1 as illustrated in FIG. 3. When bending the sealed side part 134, as illustrated in FIGS. 2 and 3, the bending may be performed once, but is not limited thereto. For example, the bending may be performed in various methods, for example, a double side folding method in which the bending is continuously performed two times. Also, after bending the sealed side part 134, taping may be performed using a separate insulation tape. As described above, the sealed side part 134 may be bent to reduce the entire volume of the secondary battery 1, thereby improving the energy efficiency to volume, and the secondary battery 1 may be easily inserted into a specific space to increase in space utilization.

However, according to an embodiment of the present invention, the secondary battery 1 may increase in thickness by the sealed side part 134. Therefore, if the sealed side part 134 of the secondary battery 1 contacts the cooling unit 3, the cooling efficiency may be deteriorated rather than the case in which the folding edge part 135 contacts the cooling unit 3. This will be described below in detail.

Figure 4:
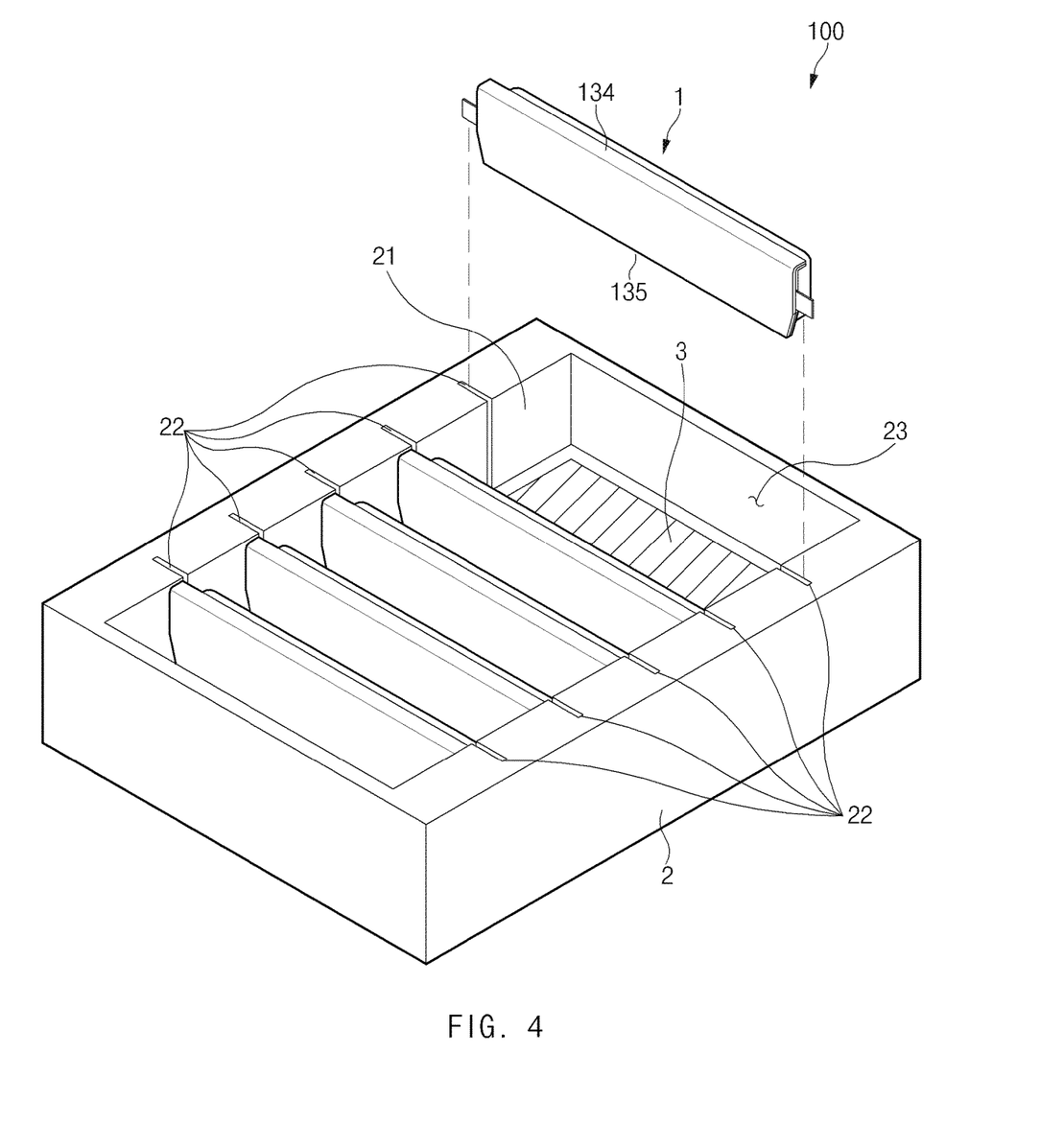
FIG. 4 is an assembly view of a battery module according to an embodiment of the present invention.

FIG. 4 is an assembly view of the battery module according to an embodiment of the present invention.

The battery module 100 may be assembled using the manufactured secondary batteries 1. When using the battery module 100, the secondary batteries that generate heat may be improved in cooling efficiency. For this, the battery module 100 according to an embodiment of the present invention includes: a secondary battery 1 including an electrode assembly 10 formed by alternately stacking an electrode and a separator and a pouch type battery case 13 which accommodates the electrode assembly 10 therein and in which an upper case 131 and a lower case 132 are integrated with each other; a housing which includes at least one opening 23 and into which the secondary battery 1 is inserted through the opening 23; and a cooling unit 3 formed in the housing 2 and disposed at one side of the secondary battery 1. The battery case 13 includes a folding edge part 135 formed at an area on a side of the secondary battery at which the upper case 131 and the lower case 132 are folded at an edge where the upper case 131 and the lower case 132 are connected, and in the secondary battery 1, the folding edge part 135 directly contacts the cooling unit 3.

The housing 2 may accommodate at least one secondary battery 1. Since the secondary battery 1 is fixed, the secondary battery 1 may stably supply electricity to the outside. This housing 2 includes at least one opening 23. Also, the secondary battery 1 is inserted into the housing 2 through the opening 23. When the secondary battery 1 is inserted into the housing 2, the opening 23 may be covered by a separate cover (not shown) to prevent moisture or other foreign substances from being permeated. Here, the cover may not be provided, or the opening may be covered by a cover having a mesh shape so that external air passes to further improve the cooling efficiency.

The housing 2 includes at least a pair of slots 22. The slots 22 are formed in corresponding positions of a pair of inner walls 21 facing each other of the housing 2. Here, the pair of inner walls 21 are a pair of inner walls 21 surrounding the periphery of the opening 23. Also, each of the slots 22 is lengthily formed from the opening 23 in a direction toward the inside of the housing 2 from the opening 23. Therefore, when both ends of the secondary battery 1 are respectively inserted into the pair of slots 22, the secondary battery 1 is disposed in the direction in which the slots 22 are formed.

The cooling unit 3 may cool the secondary battery 1 that generates heat. For this, a separate passage (not shown) is formed inside the cooling unit 3 to allow cooling water to flow. Also, as the passage increases in thickness and length, a surface area may increase to improve the cooling efficiency.

The cooling unit 3 may have a plate shape and be formed at one side of the housing 2. Here, as illustrated in FIG. 4, the cooling unit 3 may be inserted first into the housing 2 through the opening 23 to install the cooling unit 3 on the bottom of the housing 2. Also, since the cooling unit 3 is disposed substantially parallel to the opening 23, one surface of the cooling unit 3 may face the opening 23. Also, when both ends of the secondary battery 1 are inserted into the slots 22, one side of the secondary battery 1 may contact one surface of the cooling unit 3. Here, as described above, each of the slots 22 is lengthily formed from the opening 23 in a direction toward the inside of the housing 2 from the opening 23. Therefore, when both ends of the secondary battery 1 are respectively inserted into the slots 22, the secondary battery 1 is upright on the cooling unit 3, in particular, is formed so that a full width of the secondary battery 1 is perpendicular to the cooling unit 3.

According to an embodiment of the present invention, the folding edge part 135 of the secondary battery 1 directly contacts the cooling unit 3. Therefore, when the cooling unit 3 is installed on the bottom of the housing 2, the secondary battery 1 is inserted in a state in which the folding edge part 135 faces a lower side. However, the present invention is not limited thereto, and if the cooling unit 3 is inserted after the secondary battery 1 is inserted first, the secondary battery 1 may be inserted in a state in which the folding edge part 135 faces an upper side.

The secondary battery 1 may be provided in plurality. For this, the plurality of slots 22 are also provided in plurality and are formed side by side at a predetermined interval on the inner wall 21 of the housing 2. When the plurality of secondary batteries 1 are respectively inserted into the slots 22, the plurality of secondary batteries 1 may be arranged side by side inside the housing 2.

Even if the plurality of secondary batteries 1 are provided, only one cooling unit 3 may be provided. As a result, in all of the plurality of secondary batteries 1, each of the folding edge parts 135 may directly contact the one cooling unit 3. Therefore, since the cooling unit 3 does not need to be formed for each of the plurality of secondary batteries 1, the entire volume of the battery module 100 may be reduced.

Figure 5:
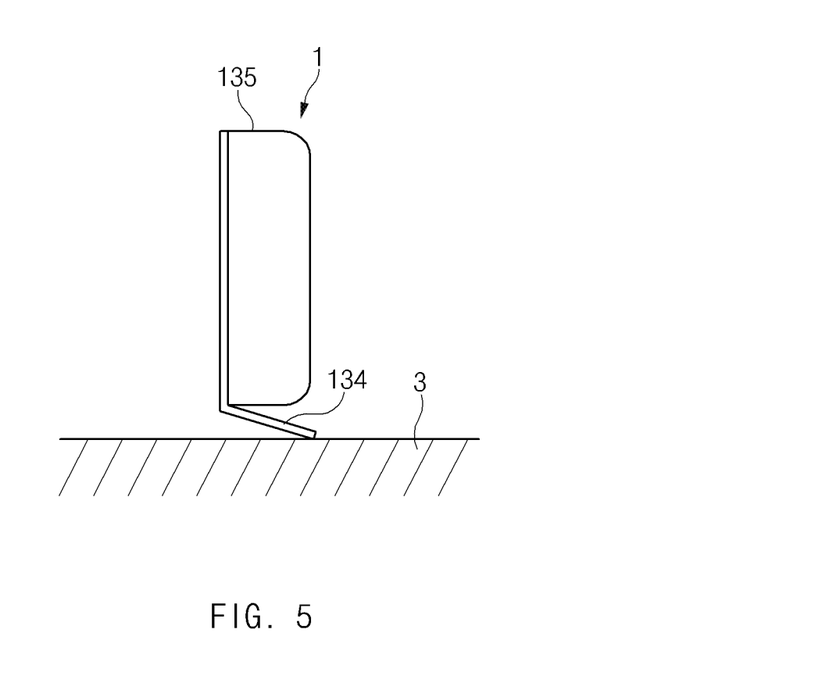
FIG. 5 is a schematic view illustrating a state in which the sealed side part of the secondary battery contacts a cooling unit.

FIG. 5 is a schematic view illustrating a state in which the sealed side part 134 of the secondary battery 1 contacts the cooling unit 3.

As described above, when the area to which the upper case 131 and the lower case 132 are connected is folded, the folding edge part 135 is formed. Also, when the sealing part formed on the edges of the upper case 131 and the lower case 132 are sealed in a state of contacting each other, the sealed side part 134 is formed. The sealed side part 134 may be bent to completely manufacture the secondary battery 1.

When the sealed side part 134 is bent, the sealed side part 134 may be bent in a direction, in which the cup part 133 of the secondary battery 1 is formed, so as to reduce the volume of the secondary battery 1. However, as illustrated in FIG. 5, if the sealed side part 134 of the secondary battery 1 contacts the cooling unit 3, cold air of the cooling unit 3 may not be directly transferred to the cup part 133 but be transferred to the cup part 133 through the sealed side part 134. That is, in the heat transfer between the cooling unit 3 and the cup part 133, the sealed side part 134 may serve as an obstacle to reduce the cooling efficiency.

Furthermore, if the sealed side part 134 is continuously bent twice in the double side folding manner, the sealed side part 134 may more increase in thickness to further reduce the cooling efficiency. Alternatively, when no taping is performed on the sealed side part 134, the sealed side part 134 may not contact the cup part 133. Thus, a separate air layer may be formed between the sealed side part 134 and the cup part 133 to further reduce the cooling efficiency.

Figure 6:
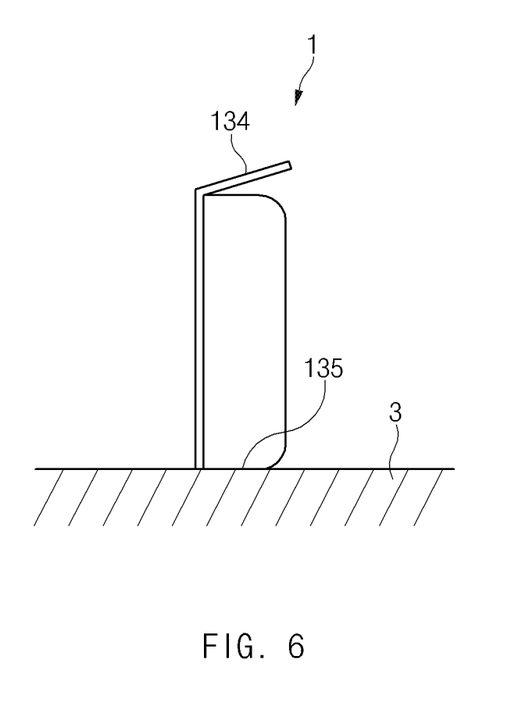
FIG. 6 is a schematic view illustrating a state in which the folding edge part of the secondary battery contacts the cooling unit.

FIG. 6 is a schematic view illustrating a state in which the folding edge part 135 of the secondary battery 1 contacts the cooling unit 3.

According to one embodiment of the present invention, as illustrated in FIG. 6, the folding edge part 135, rather than the sealed side part 134 of the secondary battery 1, directly contacts the cooling unit 3. Therefore, in the heat transfer between the cooling unit 3 and the cup part 133, since there is no obstacle, the cool air of the cooling unit 3 may be directly transmitted to the cup part 133 of the secondary battery 1 to improve the cooling efficiency.

Figure 7:
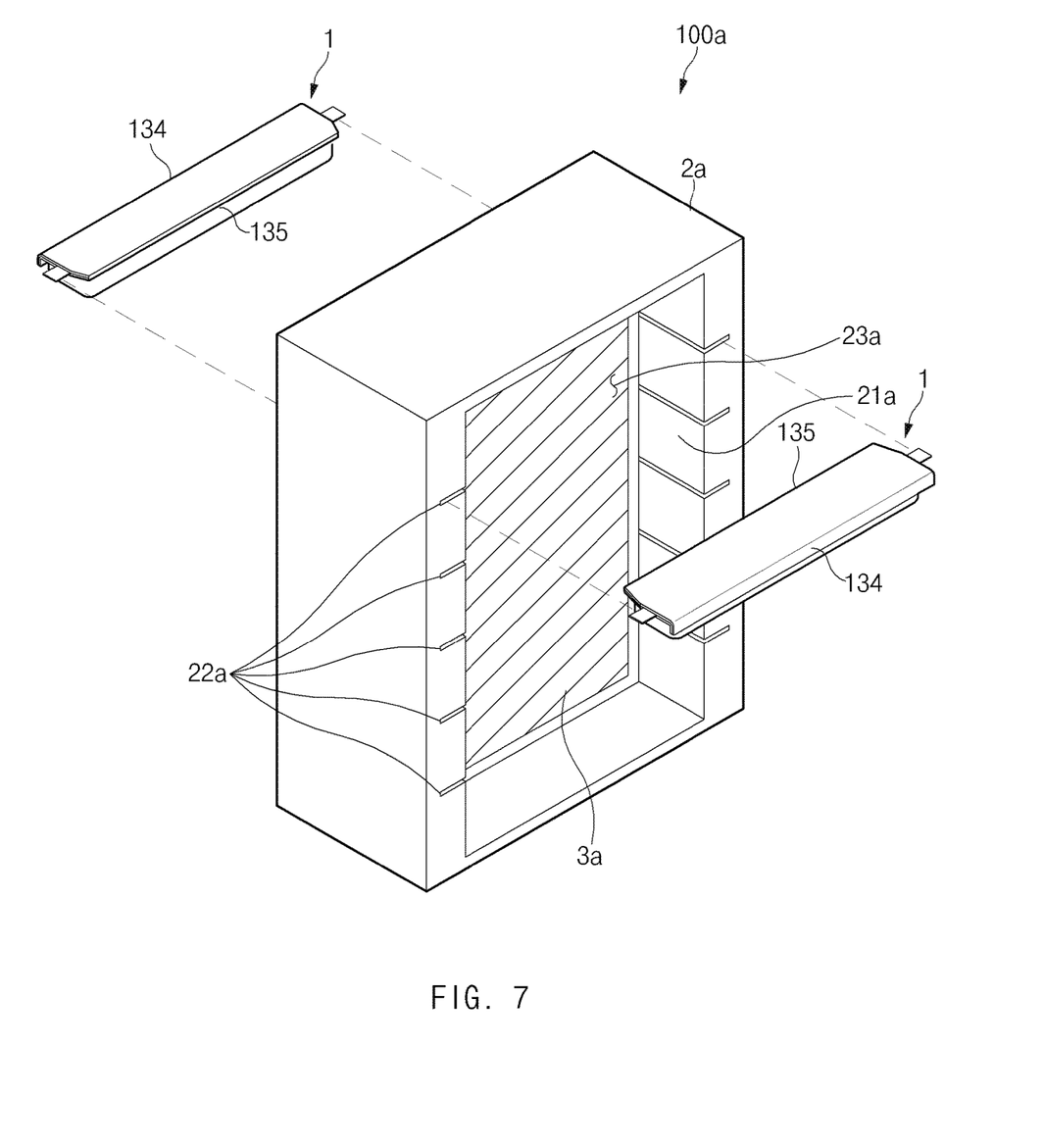
FIG. 7 is an assembly view of a battery module according to another embodiment of the present invention.

FIG. 7 is an assembly view of a battery module according to another embodiment of the present invention.

The battery module 100 according to an embodiment of the present invention may cool at least one secondary battery 1 by using one surface of the cooling unit 3. However, the cooling unit 3 may have the plate shape, and both surfaces have cooling performance.

Accordingly, in a battery module 100a according to another embodiment of the present invention, a housing 2a may have a plurality of openings 23a, for example, two openings 23a. The openings 23a may be formed in both sides of the housing 2a, which are opposite to each other, respectively. That is, a first opening 23a may be formed in one side of the housing 2a, and a second opening (not shown) may be formed in the other side of the housing 2a. As illustrated in FIG. 7, the cooling unit 3a may be disposed at an approximately center of the housing 2a. Here, both surfaces of the cooling section 3a, which are opposite to each other, may face the plurality of openings 23a, respectively.

The plurality of secondary batteries 1 may be inserted through the plurality of openings 23a of the housing 2a, respectively. For this, at least a pair of first slots 22a may be formed in corresponding positions of a pair of first inner walls 21a of the housing 2a, which face each other, and at least a pair of second slots (not shown) may be formed in corresponding positions of a pair of second inner walls (not shown) facing each other. Here, the pair of first inner walls 21a may be a pair of first inner walls 21a surrounding the periphery of the first opening 23a among the plurality of openings 23a, and the pair of second inner walls (not shown) may be a pair of second inner walls (not shown) surrounding the periphery of the second opening (not shown) among the plurality of openings 23a.

The first slot 22a is lengthily formed from the first opening 23a toward the inside of the housing 2a, and the second slot (not shown) is lengthily formed from the second opening (not shown) toward the inside of the housing 2a. Accordingly, the secondary batteries 1 may be inserted into the first slot 22a and the second slot (not shown), respectively. Here, all of the plurality of secondary batteries 1 are inserted in a direction in which the folding edge part 135 faces the cooling portion 3a, and each of the folding edge parts 135 directly contact the cooling part 3a.

Since FIG. 7 is a view illustrating one side of the housing 2a, only the first inner wall 21, the first opening 23a, and the first slot 22a are illustrated in FIG. 7, and the second inner wall (not shown), the second opening (not shown), and the second slot (not shown), which are formed at the other side of the housing 2a are not illustrated. However, a person skilled in the art may easily see that the second inner wall (not shown), the second opening (not shown), and the second slot (not shown) are disposed at the other side of the housing 2a to correspond to the first inner wall 21, the first opening 23a, and the first slot 22a through FIG. 7.

The embodiments of the present invention may have at least the following effects.

All the plurality of secondary batteries may be cooled in the one cooling unit, and the folding edge parts of the secondary batteries may directly contact the cooling unit to improve the cooling efficiency of the secondary batteries while improving the energy efficiency to the volume of the battery module.

The effects of the prevent invention are not limited by the aforementioned description, and thus, more varied effects are involved in this specification.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

What is claimed is:

1. A battery module comprising:
   a secondary battery comprising an electrode assembly including alternately stacked electrodes and separators, and a pouch type battery case having a cup part which accommodates the electrode assembly therein;
   a housing which comprises one or more openings and into which the secondary battery is inserted through one of the one or more openings; and
   a cooling unit disposed in the housing at one side of the secondary battery,
   wherein an upper case and a lower case of the battery case are integrated with each other to define a folding edge part at an area on a side of the secondary battery at which the upper case and the lower case are folded at an edge where the upper case and the lower case are connected, and
   the folding edge part of the secondary battery and the cup part of the battery case both directly contact the cooling unit,
   wherein the housing includes a pair of inner walls that face each other and extend from a periphery of one of the one or more openings, at least a pair of slots are disposed from an opening of the at least one opening at corresponding positions of a pair of inner walls of the housing that face each other in corresponding positions of the pair of inner walls, respectively, and wherein ends of the secondary battery are respectively disposed in the pair of slots.

2. The battery module of claim 1, wherein the folding edge part extends along a full length direction of the secondary battery, which is greater than a full width direction of the secondary battery.

3. The battery module of claim 2, wherein the secondary battery has a ratio of a full length to a full width of 2:1 or more.

4. The battery module of claim 1, wherein the cooling unit has one surface facing one of the one or more openings.

5. The battery module of claim 1, wherein the secondary battery has a full width extending in a direction perpendicular to one surface of the cooling unit facing the secondary battery.

6. The battery module of claim 1, wherein ends of the secondary battery are disposed within the pair of slots, respectively.

7. The battery module of claim 1, wherein the secondary battery is one of a plurality of secondary batteries, and the plurality of secondary batteries are disposed side by side in the housing.

8. The battery module of claim 7, wherein the folding edge parts of the plurality of secondary batteries, respectively, directly contact the same cooling unit.

9. The battery module of claim 1, wherein the one or more openings includes a plurality of openings, and the plurality of openings are in both sides of the housing, which are opposite to each other, respectively.

10. The battery module of claim 9, wherein opposing surfaces of the cooling unit face the plurality of openings, respectively.

11. A battery pack comprising the battery module of claim 1.

12. A device comprising the battery pack of claim 11.

13. The device of claim 12, wherein the device comprises a computer, a notebook, a smart phone, a mobile phone, a tablet PC, a wearable electronic device, a power tool, an electric vehicle (EV), a hybrid electric vehicle (HEV), a plug-in hybrid electric vehicle (PHEV), or a power storage device.

* * * * *